Patented Oct. 4, 1938

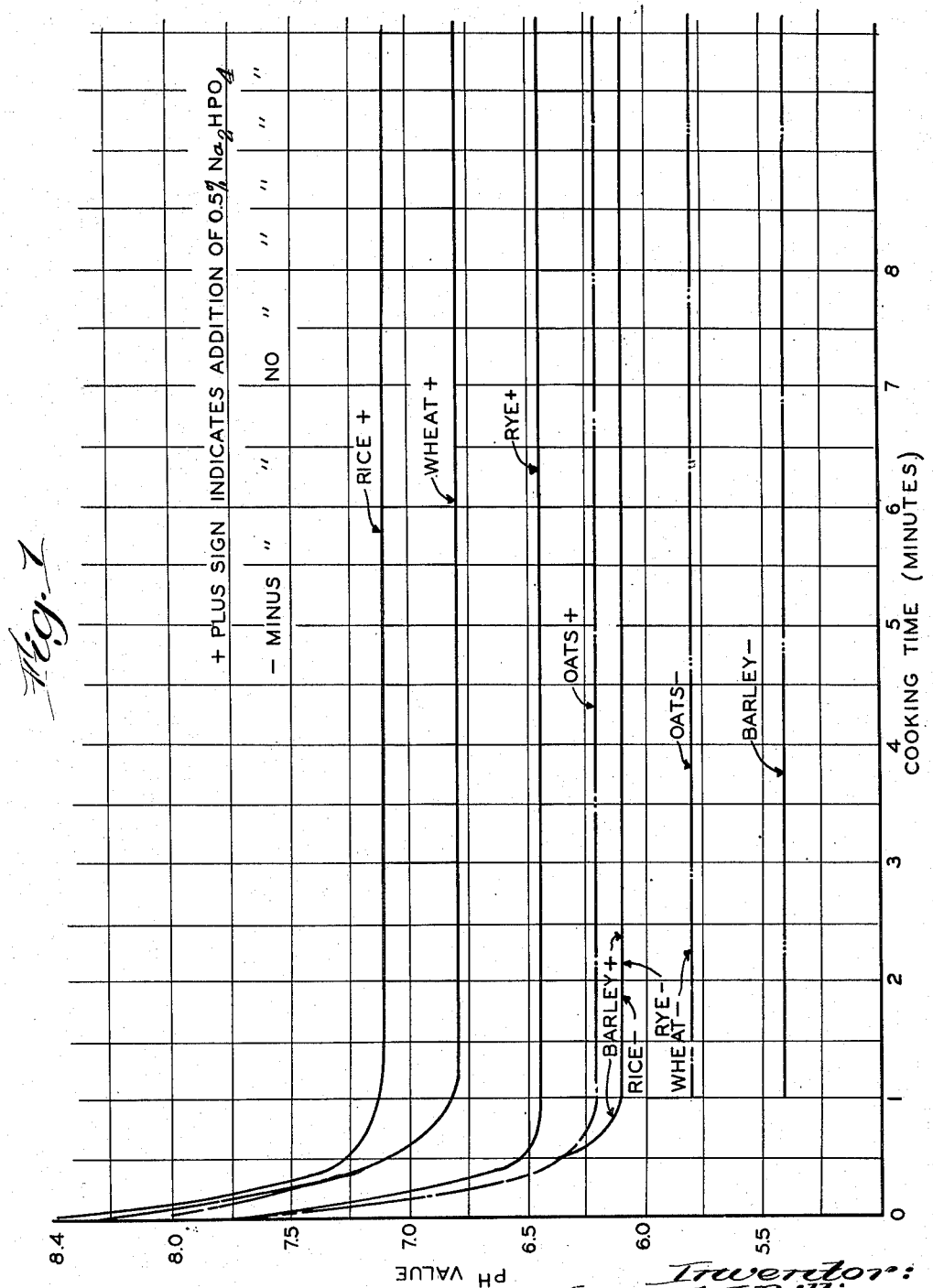

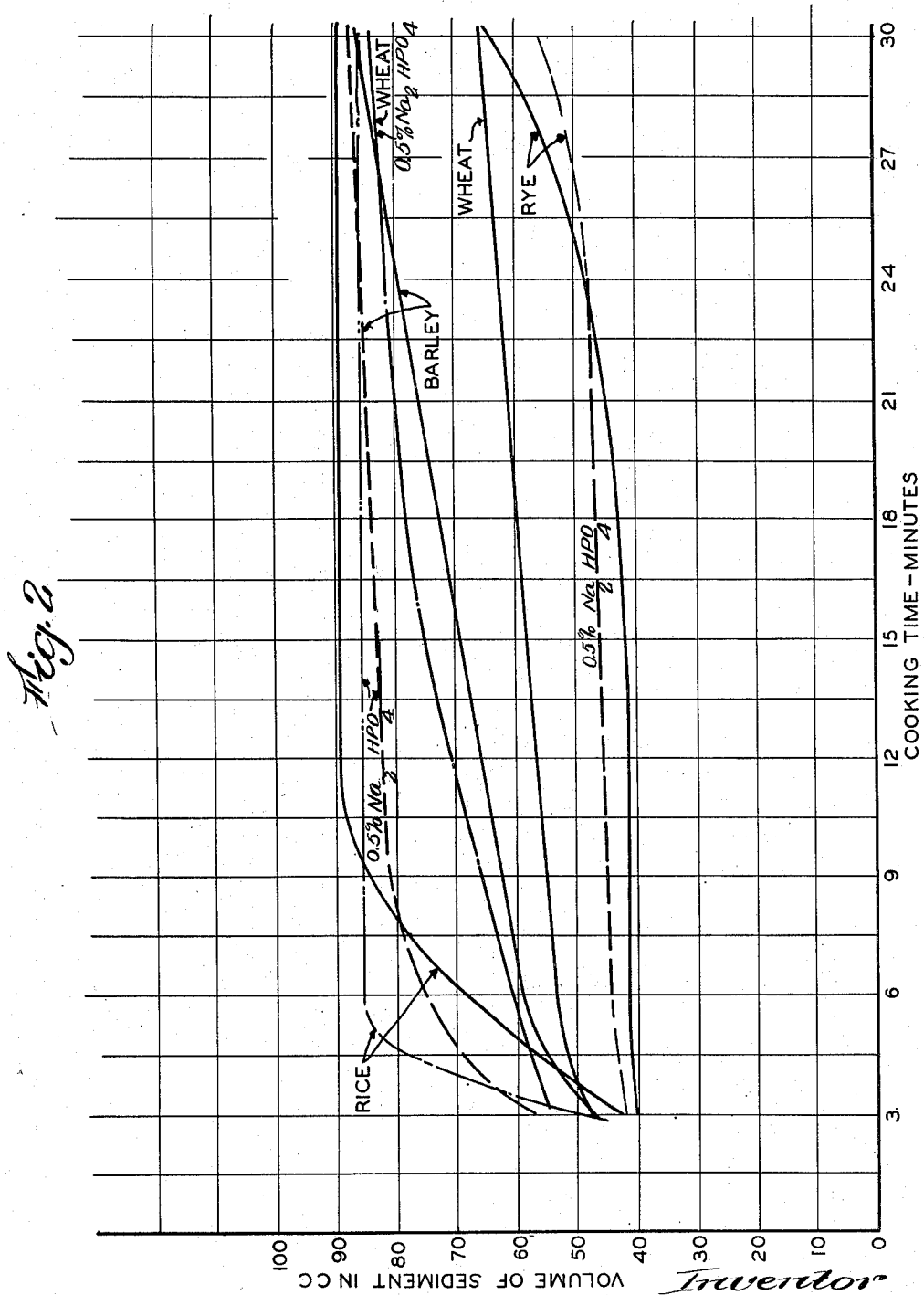

2,131,881

UNITED STATES PATENT OFFICE 2,131,881

METHOD OF TREATING CEREALS AND RESULTING PRODUCT

Howard J. Billings, South Acton, Mass., assignor to Arthur D. Little, Incorporated, Cambridge, Mass., a corporation of Massachusetts Application December 28, 1935, Serial No. 56,503

6 Claims. (Cl. 99—83)

This invention relates to a method of treating cereals and more particularly comminuted cereal grains, such as granulated wheat or corn, and to the resulting product.

In the preparation of cereals, for the purpose of rendering them suitable for human consumption, it is customary to crush or grind them to a fairly coarse or intermediate size of grain, as distinguished from flour, etc., and then to boil in water or steam until thoroughly cooked. The cooking operation with wheat or corn, for example, usually requires from 15 minutes to 45 minutes, in order to obtain a thoroughly cooked product. Such a cooking period is, however, inconvenient, especially for breakfast, when the great majority of cereals are eaten and when people have the least time for their preparation.

It is an object of this invention to provide a method of treating or conditioning cereals whereby the time required for effecting a thorough cooking may be materially reduced, without, of course, deleteriously affecting the keeping properties and healthful characteristics as well as flavor of the cereal as a food. A further object is to effect such treatment at the time of manufacture and to have the treated cereal in a condition in which it may be conveniently handled, packaged, shipped, and stored by the ultimate consumer until such time as he may desire to use it. Another object of the invention is to condition the cereal in its manufacture so that it will acquire the properties most suited to rapid cooking, upon the addition of water, and so that the subsequent cooking operation shall also be facilitated and accelerated. Other objects will appear from the following disclosure.

In accordance with the invention, the cereal grains are first crushed or ground to the desired size, in the customary manner; for example, the grains may be reduced to a mesh size of from 10 to 35. In this condition each resulting granule will expose a considerable portion of the interior of the original grain substance and the ratio of surface area to the granule mass or volume is relatively high. The starch cells of each granule are more or less associated with, and it is thought, surrounded and protected by the protein content of the granule. Cooking of cereals is associated with the breaking down of the starch cells. The protein is believed to act as a protective covering which hinders water from reaching the starch cells to break them down.

It has been found, for example, that if granular cereals as above described are added to water, the resulting pH value is lower than pH=7, indicating the presence of an acid or of an acidically ionized protein. Usually both are present. But although active in this respect, they do not appear to be sufficiently soluble or in a condition suitable for their ready dissolution in water.

By the present invention ground or comminuted granules of cereals (and more particularly corn and wheat) are converted to a condition favorable to rapid cooking by treating with an alkaline reagent which is adapted to lower the hydrogen ion concentration or raise the pH value of the food itself and the cooking water containing the food and thereby to increase and maintain the pH value of the same when cooked in the presence of moisture (e. g., after bringing to the boiling point or boiling about one minute in several times its volume of water) by approximately .3 to 1.0 (e. g. from pH=6.1 to pH=6.4, in one case; or from pH=6.1 to pH=7.1 in another) above that which the untreated cereal manifests when added to water alone.

It is now found that the elevated and maintained pH value of the water in which the cereal is cooked need not be at or above the neutral pH value of water,—i. e., 7,—in order to increase the rapidity and facility of the cooking operation, but that a maintained increment of pH which is materially above that which is normal to a mixture of the cereal and water alone is sufficient to effect the desired result of rendering the cereal rapid-cooking by boiling. Of course, freely soluble and preferably non-precipitating reagents are contemplated, such as salts of the alkali metals, and in any event only those which are suitable to the human system.

In determining the cooking effect upon cereals, it is found that a reliable factor is the apparent volume which the cereal occupies in the cooking water at any given point in the cooking operation, upon permitting it to settle. For example, if 5 grams of the cereal be boiled in water in excess of that usually used in cooking for purposes of eating (e. g., 90 c. c.) and for a sufficient time to render it unquestionably and thoroughly cooked, it will usually be found to have swelled so as to occupy approximately 50 c. c. or somewhat more upon standing and settling fifteen minutes. And conversely, a cereal which has been thus swelled by boiling in water may safely be regarded as adequately cooked. Nevertheless, cooking may be still further continued; this will be accompanied by a further swelling of the cereal, even to the extent of occupying the entire volume of the cooking water under certain conditions. Such swelling (beyond that of normal satisfactory cooking) is further extended, if the pH value is raised, but it also is related in some degree both to the specific composition of the reagent or reagents used and to the particular cereal treated. Different cereals undergo different degrees of swelling in becoming cooked under like conditions.

The invention will be more particularly described in respect of its application to various granulated cereals, reference being made to the accompanying drawings, in which:

Fig. 1 is a chart of the pH values of the cooking water, plotted against the cooking time (in minutes) with various cereals—both with and without the use of reagents, in accordance with this invention; and Fig. 2 is a chart showing the volume increase of cereals, plotted against the time of cooking for the various cereals indicated, with and without the addition of the reagents in accordance with this invention.

As indicated by the results shown in these charts, other comminuted cereals, such as rice, barley, rye and oats, may be improved, by treatment in accordance with the invention, as well as comminuted wheat. Granulated corn may also be treated in accordance with the invention, with improved results.

By referring to the drawings, it will be observed that when cooked in water alone the pH value of the cooking water during the cooking assumes a pH which is on the acidic side of neutrality. Distilled water has a rather indefinite pH (as determined by the usual pH color indicators) due to almost entire lack of buffers or other constituents. The pH of the cooking water before cooking and before adding reagents or cereals or other ingredients may, therefore, be neglected as far as ordinary water is concerned.

The purpose of the present invention may be served by adding suitable compounds to the food in an amount such that the pH value of the so-treated food will be raised, preferably within the limits specified, at the time the consumer adds it to the cooking water and/or begins to cook it. The development of such pH value in the cooking water is attributable primarily, if not solely, to the dissolving of the reagent. But strongly alkaline reagents should not be employed in large amounts. On the contrary, a general working rule is to use the minimum amount of the reagent which will, in an instant case, effect the desired reduction in the time required for cooking the cereal (e. g., to one-third to one-fifth of the ordinary time, which in the case of wheat is to about 3 to 5 minutes) by boiling in the usual way. The reagent should, however, be freely soluble (in the amounts used) and not susceptible to the formation of precipitates or insoluble matter in or upon the cereal.

Accordingly, while small amounts of highly ionized reagents might be employed, which would create higher initial pH value in the cooking water to which the cereal is added, such strongly alkaline reagents are not herein preferred. On the other hand, a reagent manifesting a low initial pH value, which may be used in relatively large quantity, or which has a large neutralizing capacity with respect to the ionization of the cereal, may also be used satisfactorily, if the quantity required is not too great, so as to affect the taste, for example. The underlying criterion, however, is that the reagent added shall have the characteristic of raising the pH value of the cereal in the cooking water, especially upon and after subjecting to boiling. Thereafter, it also appears to be a characteristic of the reagent treated cereal, that it maintains the pH value then attained throughout prolonged boiling treatment and uniformly constant for substantially any reasonable period of time. Under the influence of this alkaline neutralization and bufffering action, as indicated by the resulting pH value of the water in which the treated cereal is cooked, the protective component of the cereal which normally retards the cooking effect upon the cereal granules is rendered permeable to heat and moisture, so that the granule as a whole is readily hydrated and rapidly swells in the boiling water to the degree which is indicative of thorough cooking (as effected by prolonged cooking in water) in a matter of a few minutes only.

A typical and representative example of such buffer compounds is presented by di-sodium phosphate. It is found that approximately 0.2 to 2.0% of anhydrous di-sodium phosphate, on the dry weight of the food treated, is an adequate amount. Other compounds capable of imparting the proper pH may be used either alone or in various admixtures, due care of course being exercised that the compound is not harmful or objectionable either to the food or to the consumer. In place of di-sodium phosphate, mixtures of the various phosphates of sodium may be used, as long as the above requirements of the process are fulfilled. Other suitable compounds are: sodium bicarbonate, trisodium citrate, calcium phosphate, dipotassium tartrate, etc.

In general, salts of strong alkalies with weak acids will give the desired pH and buffering effect, and selection of a material from this class, with due regard for healthfulness, taste, appearance, cost, etc., may be made by exercising proper care. There are some drawbacks to certain materials which otherwise would appear entirely satisfactory as judged by the standards hereinabove set forth. For example, sodium bicarbonate, although otherwise entirely satisfactory, causes some foaming (due to evolution of carbon dioxide) when the food is cooked by the consumer. Such occurrence is not harmful. On the contrary, it may be beneficial, but, if not provided for, might prove annoying by causing the material to foam and overflow the container.

Examples of suitable methods for carrying out the invention are as follows:

I. For a dry treating process, the food product, as reduced to granulated form and before packaging for shipment to the trade, is mixed, dry, with 0.2% to 2.0% of very finely ground di-sodium phosphate. When the mixture is homogeneous, the pulverized di-sodium phosphate is uniformly distributed and comparatively firmly retained, by adsorption or adhesion or both, upon the cereal granules. The treated cereal may then be handled, packaged, shipped and stored without subsequent segregation and is ready to be cooked. Cooking is effected in the usual way, except that a shorter period of time will be required.

II. If a wet application is desired, the treating compound, preferably in relatively concentrated solution or suspension, may be sprayed onto the dry food product or otherwise uniformly distributed and incorporated by any suitable means. The treated product may then be dried if this is desirable or necessary before charging into packages or other containers for shipment.

III. The treating compound, either dry or in solution, may be applied to the food product when the latter is in a dry or moist, but not fluid or pasty, condition, after which the food may be obtained in or reduced to a dry or solid form, as desired.

The product, as treated by any of the procedures above described, may be stirred into water and boiled,—or in some cases, merely moistened with water and then steamed,—whereupon the cereal becomes cooked in a much shorter time interval than is otherwise possible. With granulated wheat as above described, for example, the material is thoroughly cooked in from 3 to 8 minutes and is then thoroughly done and ready for eating.

As pointed out above, one function of an initially high pH value is believed to be that it affords a reaction potential toward the protective component of the cereal. Being highly reactive, and the reagent being present in small amounts in proportion to the cereal and not in sufficient proportions in respect of the protective protein or other component to predominate greatly, such high reaction potential is soon spent and the pH of the mixture while higher than that of the cereal alone, is not highly alkaline but may in fact be of a pH value even somewhat below neutrality (7).

In this medium or condition of elevated and maintained pH value, the cereal granules are penetrated by heat and aqueous solution and the conversion of the food to edible form, by cooking, is accelerated. This may be attributable to the setting up and maintenance of the Donnan equilibrium in respect of the semi-permeable membranes of the cereal, to a hastening of the hydrolysis and subsequent solution of both the starch and protein content of the grain, to the solvent effects of the alkalinized or higher pH value of the cooking water, (though not necessarily alkaline, as noted) upon the resulting products, or to other conditions ancillary to the provision and maintenance of the pH values as above mentioned, especially during the cooking operation, but it is sufficient to state that such conditions are effective and sufficient to attain the desired result of readily, safely and certainly providing a quick-cooking cereal.

Moreover, such treatment and the resultant conditioning will mechanically avoid any tendency which might otherwise be encountered for the reagent to separate from the cereal and to segregate in the container. It will also assure that the cereal will immediately exhibit and maintain an elevated pH value upon boiling in water, which pH value is favorable to rapid cooking action. This conditioning may and probably does involve the accelerated physical transmission of heat, permeability to water or moisture, etc. as well as the active chemical receptivity of the cereal toward water so as to facilitate hydrolysis and like chemical reactions of the boiling or cooking treatment.

It should be understood that the present disclosure, (which is a continuation in part of my application Serial No. 738,428, filed August 4, 1934), is for the purpose of illustration only, and that this invention includes all modifications and equivalents which fall within the scope of the appended claims.

I claim:

1. Process of preparing cereals to render them quick-cooking, comprising the step of treating the raw cereal in crushed granular form with a sufficient amount of a buffer reagent which is characterized by raising and maintaining the pH value of the mixture by 0.3 to approximately 1 when put into water and cooked, but not appreciably to exceed that of neutrality, without causing foaming.

2. Process of preparing cereals to render them quick-cooking, comprising the step of treating the raw cereal in crushed granular form with a sufficient amount of a dry, finely divided buffer reagent which is characterized by raising and maintaining the pH value of the mixture by 0.3 to approximately 1, when put into water and cooked, but not appreciably to exceed that of neutrality, without causing foaming.

3. Process of preparing cereals to render them quick-cooking, comprising the step of treating the raw cereal in crushed granular form with a sufficient amount of di-sodium phosphate to raise and maintain the pH value of the mixture, when put into water and cooked, by 0.3 to approximately 1, but not appreciably to exceed that of neutrality.

4. Process of preparing cereals to render them quick-cooking, comprising the step of treating the raw cereal in crushed granular form with a sufficient amount of dry, finely divided di-sodium phosphate to raise and maintain the pH value of the mixture, when put into water and cooked, by 0.3 to approximately 1, but not appreciably to exceed that of neutrality.

5. A treated, quick-cooking, raw cereal, in crushed granular form, characterized by containing a non-foam-forming buffer reagent which is in dry, finely divided condition and alkaline in water solution, said cereal manifesting and maintaining an elevation of the pH value upon cooking in water, of approximately 0.3 to approximately 1 above that of the cereal alone, but not appreciably to exceed that of neutrality.

6. A treated, quick-cooking cereal, comprising a raw cereal in crushed granular form and a sufficient amount of di-sodium phosphate to raise and maintain the pH value of the mixture, when put into water and cooked, by 0.3 to approximately 1, but not appreciably to exceed neutrality.

HOWARD J. BILLINGS.